United States Patent

Schaust et al.

(10) Patent No.: US 6,547,342 B1
(45) Date of Patent: Apr. 15, 2003

(54) ACTUATOR UNIT FOR AN ELECTRONICALLY CONTROLLED VEHICLE BRAKE SYSTEM

(75) Inventors: Karlheinz Schaust, Fachbach (DE); Jens Hauke Müller, Kalt (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/122,864

(22) Filed: Apr. 15, 2002

Related U.S. Application Data

(63) Continuation of application No. PCT/EP00/10358, filed on Oct. 20, 2000.

(30) Foreign Application Priority Data

Oct. 21, 1999 (DE) .......................................... 199 50 862

(51) Int. Cl.⁷ .................................................. B60T 8/44
(52) U.S. Cl. ................................. 303/114.1; 303/119.1; 303/11
(58) Field of Search .......................... 303/114.1, 114.3, 303/119.1, 115.4, 10, 901, 115.5, 11

(56) References Cited

U.S. PATENT DOCUMENTS

| | | | | |
|---|---|---|---|---|
| 4,462,642 A | * | 7/1984 | Leiber | 303/113.4 |
| 4,649,340 A | * | 3/1987 | Zabler | 303/20 |
| 5,588,718 A | * | 12/1996 | Winner et al. | 303/113.1 |
| 5,887,432 A | | 3/1999 | Clauss et al. | |
| 5,941,608 A | * | 8/1999 | Campau et al. | 303/113.4 |
| 5,988,768 A | | 11/1999 | Schaefer et al. | |
| 6,033,036 A | * | 3/2000 | Ruffer et al. | 188/358 |
| 6,135,572 A | | 10/2000 | Wörsdorfer et al. | |
| 6,183,050 B1 | * | 2/2001 | Ganzel | 188/358 |
| 6,192,685 B1 | * | 2/2001 | Bourlon et al. | 60/566 |
| 6,217,127 B1 | * | 4/2001 | Kusano et al. | 303/3 |
| 6,312,061 B1 | * | 11/2001 | Schliebe et al. | 303/20 |
| 6,341,947 B1 | * | 1/2002 | Otomo | 303/11 |
| 6,357,835 B1 | * | 3/2002 | Boisseau | 303/113.5 |

FOREIGN PATENT DOCUMENTS

| | | |
|---|---|---|
| DE | 3124755 | 1/1983 |
| DE | 19546647 | 6/1997 |
| DE | 19638102 | 8/1997 |
| DE | 19632035 | 2/1998 |
| DE | 19643638 | 4/1998 |
| WO | 99/32337 | 7/1999 |

OTHER PUBLICATIONS

Document Bibliography and Abstract for DE3124755 from the esp@cenet database, http://12.espacenet.com/dips/viewer?PN=DE3124755&CY=ep&LG=en&DB=EPD , printed Mar. 15, 2002.

(List continued on next page.)

Primary Examiner—Christopher P. Schwartz
Assistant Examiner—Devon Kramer
(74) Attorney, Agent, or Firm—MacMillan, Sobanski & Todd, LLC

(57) ABSTRACT

Actuator unit for a hydraulic vehicle brake system, with a master brake cylinder in which a first piston, which can be displaced by an actuator, is disposed, a first brake circuit which can be connected by a valve arrangement in a basic position to the master brake cylinder or separated from the latter thereby in an actuating position, and a device which can be connected to a hydraulic chamber of the master brake cylinder to simulate the brake pedal behaviour, wherein a second piston is disposed in a displaceable manner in the master brake cylinder, wherein the displacement of one piston causes the displacement of the other piston, wherein the device for simulating the brake pedal behaviour is switched to an active or inactive mode through the displacement.

9 Claims, 6 Drawing Sheets

OTHER PUBLICATIONS

Document Bibliography and Abstract for DE19546647 from the esp@cenet database, http://12.espacenet.com/dips/viewer?PN=DE19546647&CY=ep&LG=en&DB=EPD , printed Mar. 15, 2002.

Document Bibliography and Abstract for WO9932337 from the esp@cenet database, http://12.espacenet.com/dips/viewer?PN=WO9932337&CY=ep&LG=en&DB=EPD , printed Mar. 15, 2002.

* cited by examiner

ACTUATOR UNIT FOR AN ELECTRONICALLY CONTROLLED VEHICLE BRAKE SYSTEM

CROSS REFERENCE TO RELATED APPLICATIONS

This application is a continuation of International Application No. PCT/EP00/10358 filed Oct. 20, 2000, the disclosure of which is hereby incorporated by reference, and which claims priority to German Patent Application No. 19950862.3 filed Oct. 21, 1999.

BACKGROUND OF THE INVENTION

The invention relates to an actuator unit for an electronically controlled hydraulic vehicle brake system, with a master brake cylinder, which can be actuated by a brake pedal, and a reservoir for hydraulic fluid.

This actuator unit is a so-called electrohydraulic brake unit, in which the driver's braking requirement, which is passed onto the brake pedal, is only delivered to a device for simulating the brake pedal behaviour in normal operation, while the actual action on the vehicle brakes by pressurised hydraulic fluid is effected via an electronically activated pump, which builds up, maintains and/or reduces the hydraulic pressure in the wheel brakes.

The hydraulic fluid which is delivered by the pump is determined by an activation signal which is generated by a sensor which is coupled either directly or indirectly to the brake pedal.

In emergency operation the hydraulic fluid displaced by the master brake cylinder, which can be actuated by the brake pedal, is fed directly into the vehicle brakes via a connection which is then established. A vehicle brake system of this kind is also called a "push-through"-capable "brake-by-wire" vehicle brake system.

The brake system described in DE 31 24 755 A1 comprises a first brake circuit section and a second brake circuit section. The first brake circuit section comprises a master cylinder, a displacement simulator for simulating the brake behaviour and a first pressure measuring device. The second brake circuit section comprises a wheel brake cylinder and a second pressure measuring device. The two brake circuit sections can be connected and separated by one or two multiposition valves.

The multiposition valve is used both for the brake boost function and for anti-locking.

When the device is intact the master cylinder pressure only serves as control pressure, while the pressure at the wheel cylinder is fed in as servo-pressure. Should the servo-pressure supply fail, the first and the second brake circuit sections are connected by the multiposition valve, so that brake fluid flows into the wheel brake cylinder when the brake pedal is actuated. At this moment the brake-by-wire brake system function is no longer operational.

DE 196 38 102 C1 discloses a vehicle brake system in which to an actuating unit for an electronically controlled brake system comprises a master brake cylinder which can be actuated by a brake pedal. Two brake circuits extend from the master brake cylinder in order to supply wheel brakes with hydraulic fluid from a reservoir. A first valve device is disposed between the master brake cylinder and each brake circuit of the wheel brakes to open the connection between the master brake cylinder and each brake circuit of the wheel brakes with spring assistance (basic position) and block it by electromagnetic actuation (actuating position).

If the brake system is faultless, the first valve device takes up its actuating position, so that the supply of hydraulic fluid to the wheel brake is effected by an electronically controlled pressure source. If, on the other hand, a fault occurs in the electronically controlled system, the first valve arrangement returns to its basic position, so that emergency actuation of the wheel brake can be carried out from the master brake cylinder.

The outlet of the master brake cylinder is connected to a simulation device parallel to the first valve arrangement and the wheel brake. When the first valve device is in its actuating position, i.e. the wheel brake is supplied with hydraulic fluid (solely) through the electronically controlled pressure source, the simulation device serves to impart to the driver a pedal characteristic which is usual in a conventional brake system when the brake pedal is actuated.

A second valve device is disposed in the connection between the outlet of the master brake cylinder and the simulation device to block the connection between the master brake cylinder and the simulation device with spring assistance and open it by electromagnetic actuation. It is thereby possible to block the connection from the master brake cylinder to the simulation device during emergency braking of the wheel brake, so that no hydraulic fluid volume can escape into the simulation device during emergency actuation of the wheel brake. The second valve arrangement then changes over to its basic position when the first valve device also switches (or has switched) into its basic position, which means that a fault (for example undervoltage) has occurred in the electronically controlled system.

This known arrangement requires either a combined valve arrangement consisting of the first and the second valve device, or two first and second valve devices to be activated separately. The overall design of this arrangement is highly complicated. There is a permanent requirement for simplification, with unchanging—if not even increasing—quality and safety, especially on account of the competitive situation and the high pressure on costs to which motor vehicle manufacturers subject their suppliers.

SUMMARY OF THE INVENTION

An object of the invention is therefore to provide a vehicle brake system of the above-mentioned type which is of a simpler design with the same power features.

According to the invention, an actuator unit for an electronically controlled hydraulic vehicle brake system is provided which has a master brake cylinder in which a first piston, which can be displaced by an actuator, is disposed, a first brake circuit which can be connected by a valve arrangement in a basic position to the master brake cylinder or separated from the latter thereby in an actuating position, and a device which can be connected to a hydraulic chamber of the master brake cylinder to simulate the brake pedal behaviour, wherein a second piston is disposed in a displaceable manner in the master brake cylinder and the displacement of one piston causes the displacement of the other piston, wherein the device for simulating the brake pedal behaviour is switched to an active or inactive mode through the displacement.

This arrangement has the advantage of not requiring the electrically actuated valve device between the master brake cylinder and the simulation unit. As the known valve device is in its actuating position during normal operation of the vehicle brake system for safety reasons, this results in a permanent current consumption with corresponding heating. The invention also simplifies the design, which is usually structurally complicated, of the vehicle brake system, as it does not include a valve device as a separate part. Moreover, the invention teaches a procedure which does not involve electrical activation of an electromagnetic valve arrangement of this kind.

In a preferred embodiment the two pistons define with one another and with the wall of the master brake cylinder a respective first and second hydraulic chamber, wherein hydraulic fluid is held in these hydraulic chambers.

The second piston also comprises a duct leading from one of the hydraulic chambers to a lateral outlet, wherein the fluid connection leading to the device for simulating the brake pedal behaviour is disposed such that, depending on the position of the second piston, it is aligned with the outlet of the duct when the brake circuit is separated from the master brake cylinder by the first valve arrangement.

Here the device for simulating the brake pedal behaviour has a spring arrangement which is set up to act against the hydraulic pressure from the master brake cylinder. A characteristic modelling device is also associated with this device in terms of action.

In a first embodiment of the invention the characteristic modelling device is disposed in the connection between the master brake cylinder and the device for simulating the brake pedal behaviour.

In a second embodiment of the invention, which is substantially of a more compact construction, the characteristic modelling device is disposed in one of the pistons in the master brake cylinder, preferably in the flow path between one of the hydraulic chambers and the lateral outlet of the second piston.

Finally, the characteristic modelling device may also be disposed in the connection between the device for simulating the brake pedal behaviour and a hydraulic reservoir.

The device for simulating the brake pedal behaviour is formed by a cylinder/piston arrangement, in which a piston is loaded by a spring arrangement.

No hydraulic fluid can flow from the master brake cylinder into the (first) brake circuit when the arrangement is in a normal operating mode (active) with valve arrangement between the master brake cylinder and the brake circuit in the (closed) actuating position. If the first piston is actuated in this situation, the piston (as a rule the second) which switches the device for simulating the brake pedal behaviour to active or inactive mode is displaced into a position in which this device is switched to active mode. As soon as the switch to active mode has taken place, the hydraulic fluid in the first hydraulic chamber is forced through the duct in the second piston into the device for simulating the brake pedal behaviour.

Hydraulic fluid can flow into the (first) brake circuit when the arrangement is in an emergency operating mode (passive) with valve arrangement between the master brake cylinder and the brake circuit in the (open) basic position. If the first piston is actuated in this situation, the piston (as a rule the second) which switches the device for simulating the brake pedal behaviour to active or inactive mode is displaced by a spring arrangement or similar into a position in which this device is switched to inactive mode.

The first piston, when actuated, therefore forces the hydraulic fluid in the first hydraulic chamber into the first brake circuit, and the first piston simultaneously displaces the second piston, so that the second hydraulic chamber is also diminished and hydraulic fluid in the latter is forced into the second brake circuit.

Further advantages, features and properties of the invention will emerge from the following description of currently preferred embodiments of the invention with reference to the drawings.

Figure 1:
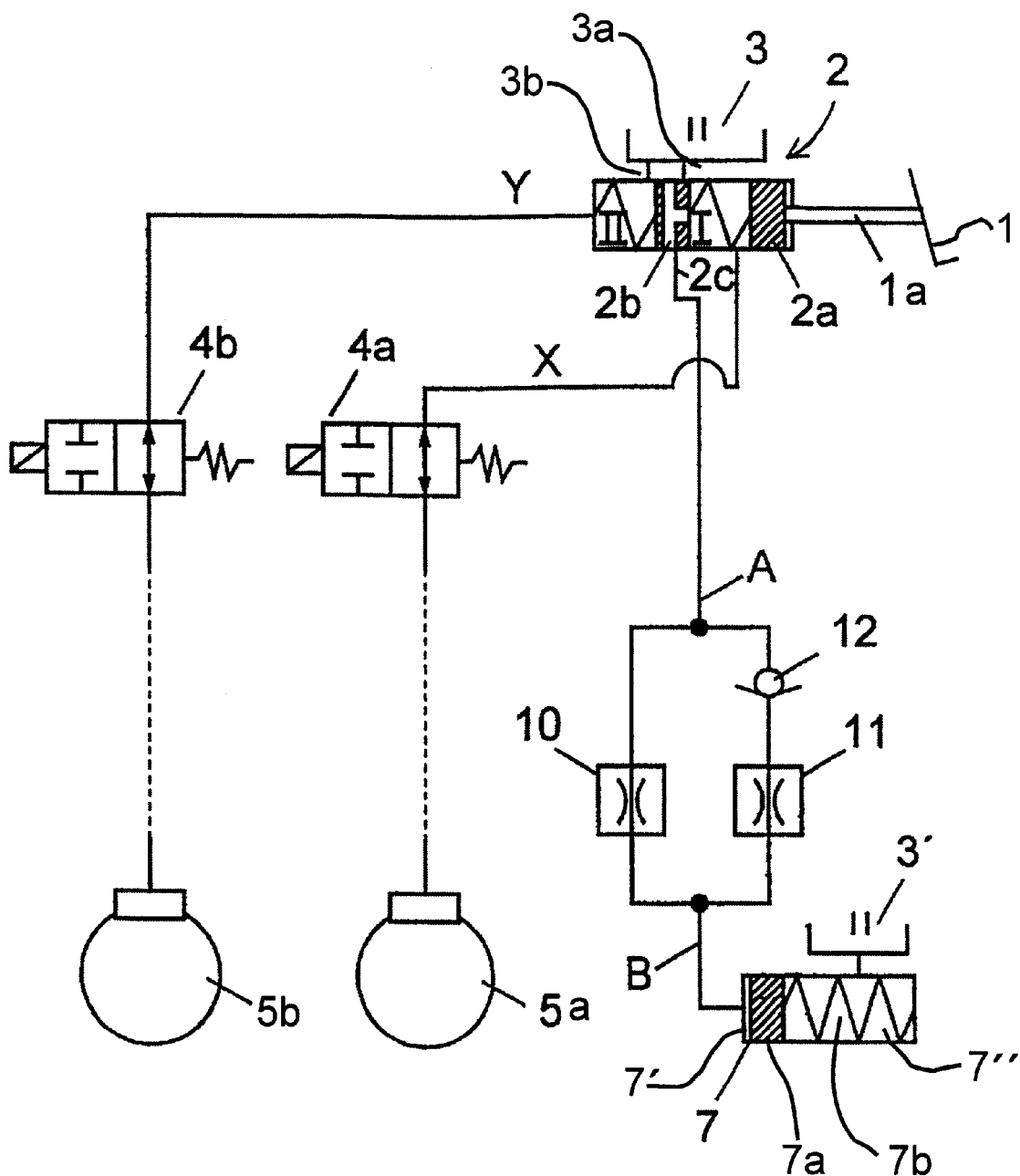
FIG. 1 shows a first embodiment of an actuator unit according to the invention for an electronically controlled vehicle brake system in a diagrammatic representation.

FIG, 1a is a partial view of the first embodiment of the actuator unit according to FIG. 1 in a passive operating mode.

FIG, 1b is a partial view of the first embodiment of the actuator unit according to FIG. 1 in an active operating mode.

Figure 2:
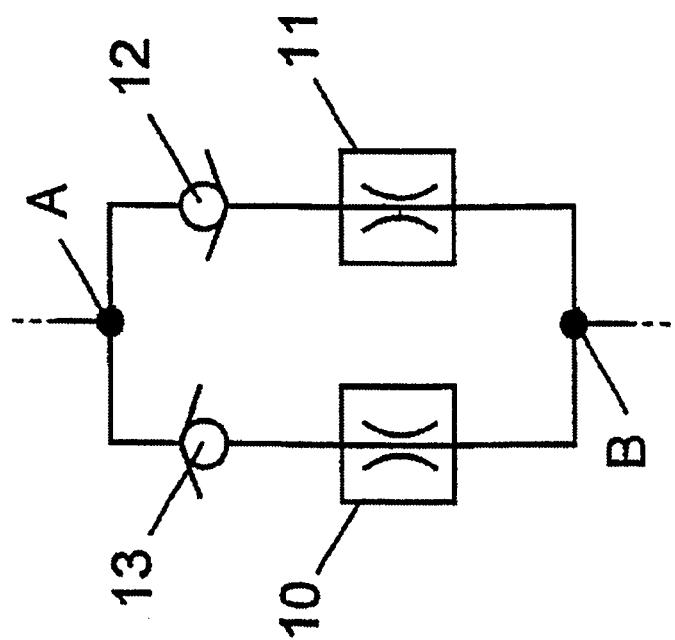

FIG. 2 shows a first modification of the characteristic modelling device associated with the device for simulating the brake pedal behaviour from FIG. 1.

Figure 3:
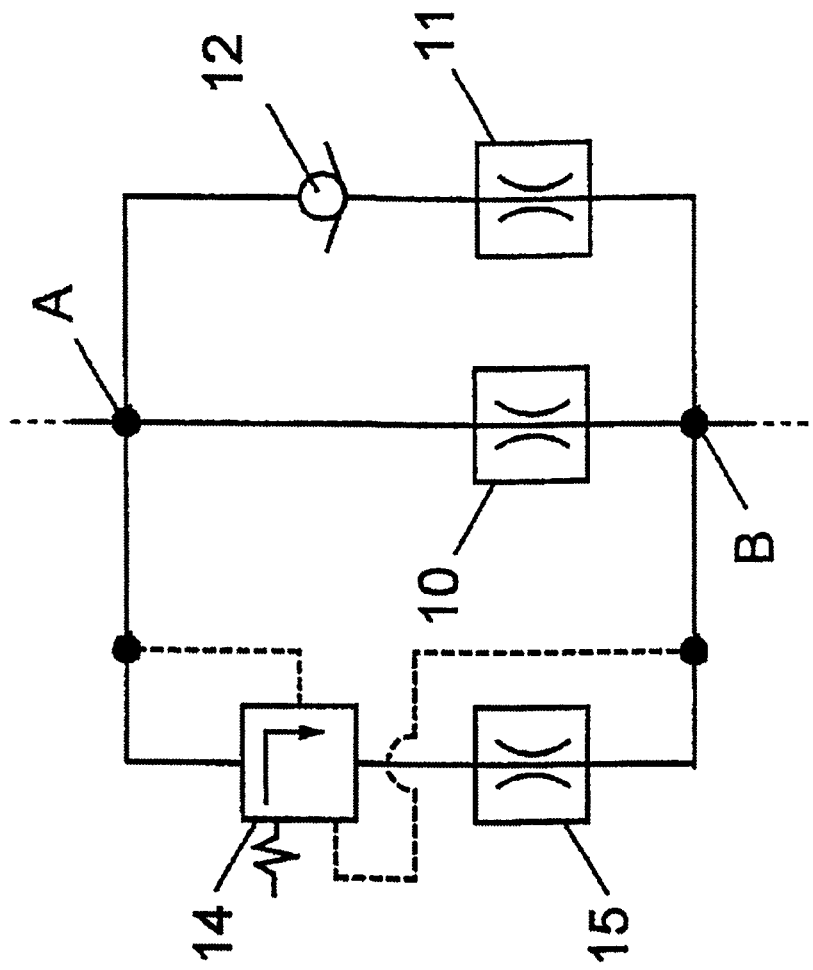

FIG. 3 shows a second modification of the characteristic modelling device associated with the device for simulating the brake pedal behaviour from FIG. 1.

Figure 4:
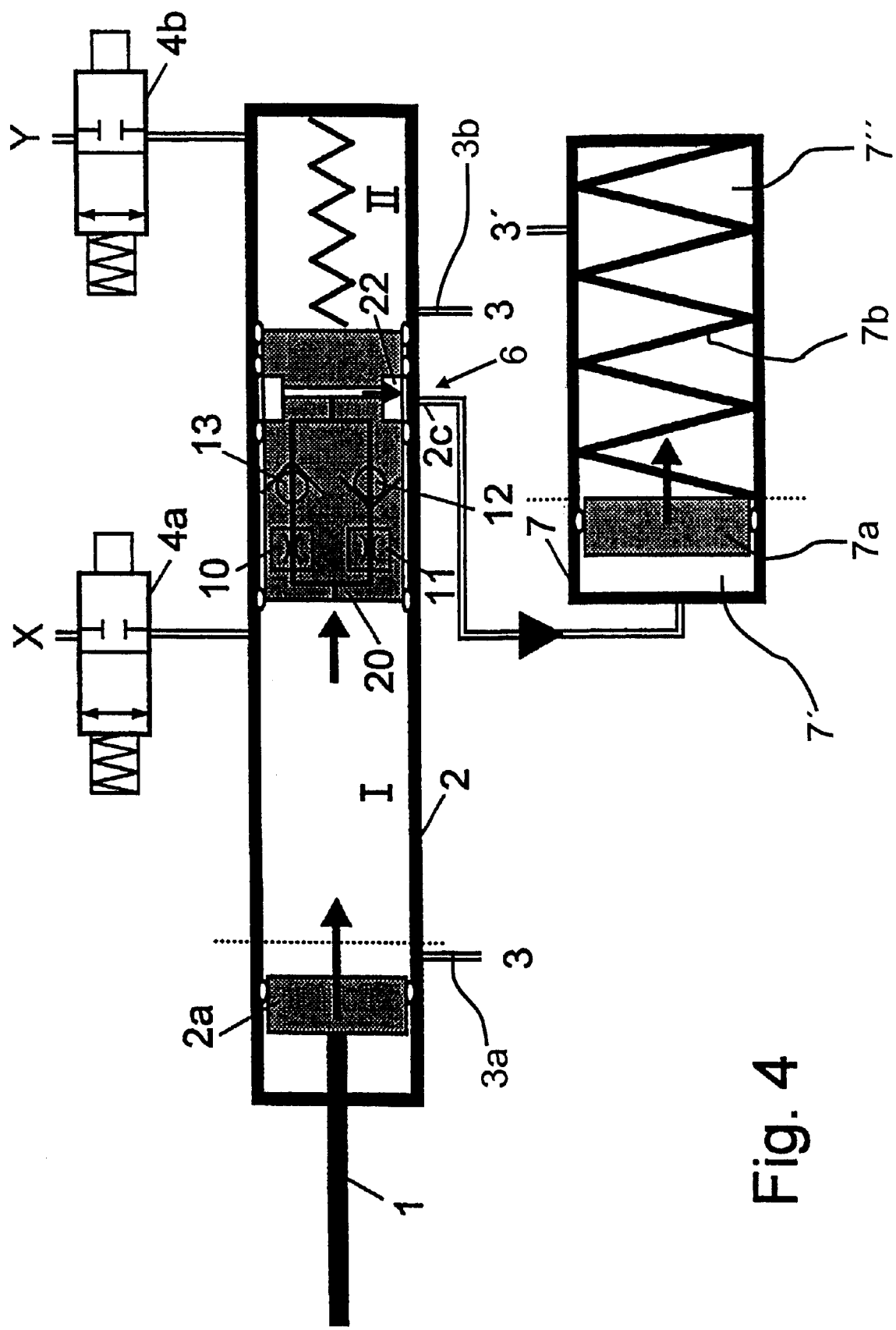

FIG. 4 shows a second embodiment of an actuator unit according to the invention for an electronically controlled vehicle brake system with an integrated device for simulating the brake pedal behaviour in a diagrammatic representation.

Figure 5:
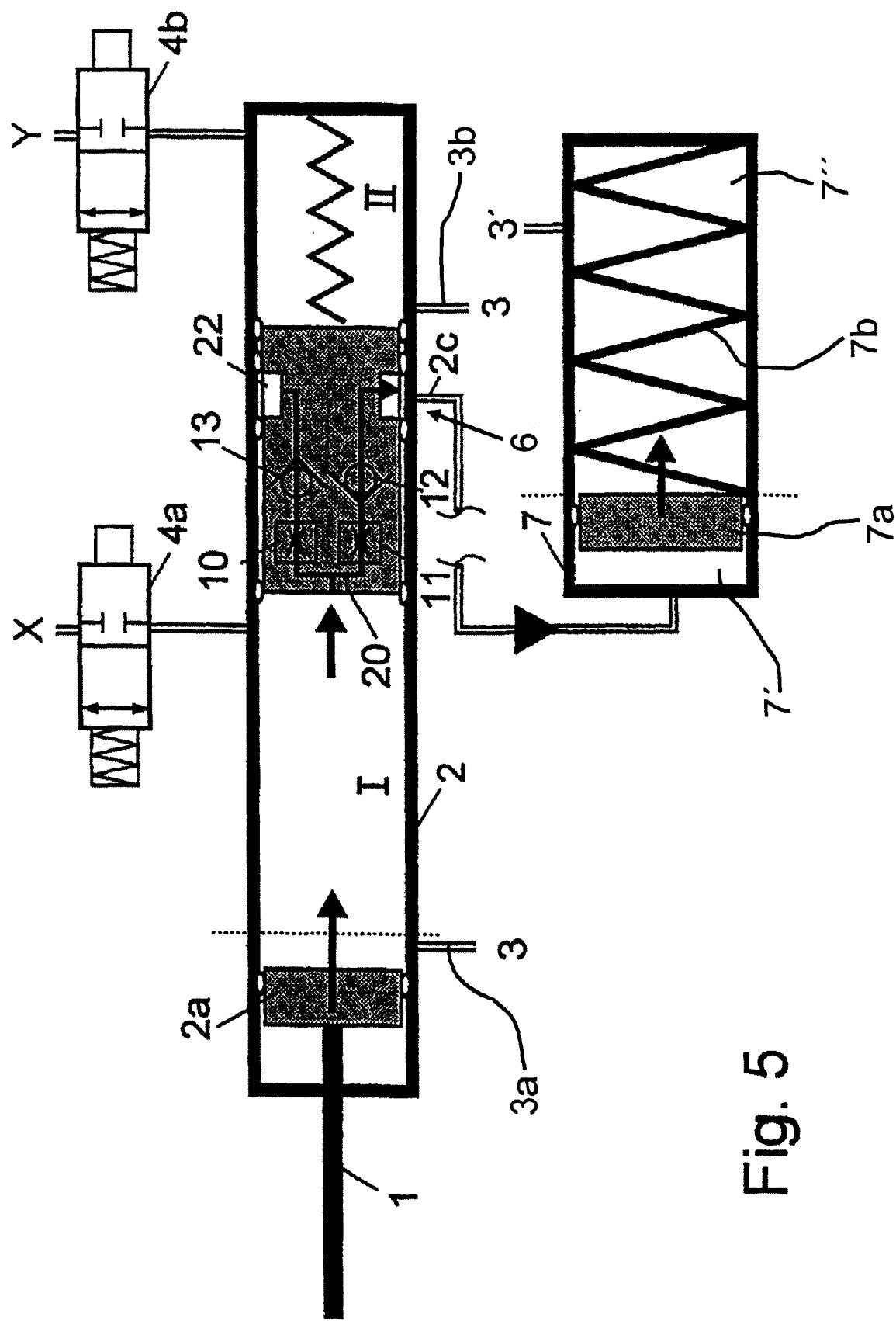

FIG. 5 shows a third embodiment of an actuator unit according to the invention for an electronically controlled vehicle brake system with an integrated device for simulating the brake pedal behaviour in a diagrammatic representation.

DETAILED DESCRIPTION OF THE INVENTION

An actuator unit according to the invention for an electronically controlled brake system is represented diagrammatically in FIG. 1. The actuator unit comprises a master brake cylinder 2, which can be actuated via an actuator in the form of a brake pedal 1 with an actuating rod 1a. A first piston 2a, which is directly and rigidly connected to the actuating rod 1a, is disposed in the master brake cylinder 2. A second piston 2b is also disposed in the master brake cylinder 2. The two pistons 2a, 2b define with one another and with the wall of the master brake cylinder 2a, respective first and second hydraulic chamber I, II, wherein hydraulic fluid is held in these hydraulic chambers. This hydraulic fluid can flow from a reservoir 3 via respective supply connections 3a, 3b into the first and the second hydraulic chamber I, II, respectively, or out of the latter.

A brake circuit X and Y, respectively, extends from the first and second hydraulic chamber I, II in order to supply respective with hydraulic fluid. A first valve arrangement 4a and 4b, respectively, is disposed between the master brake cylinder 1 and the respective wheel brake 5, 6 to open the connection between the master brake cylinder 2 and the respective wheel brake 5, 6 with spring assistance (basic position) and block it by electromagnetic actuation (actuating position).

The first valve device 4a takes up its actuating position in the active operating mode, i.e. when the system is faultless, so that the wheel brake 5 is supplied with hydraulic fluid via an electronically controlled pressure source, which is not represented in detail. If, however, a fault occurs in the electronically controlled system due, for example, to the supply voltage being too low, the first valve arrangement 4a will return to its basic position, so that emergency actuation of the wheel brake 5 can be carried out (passive operating mode).

An outlet, or fluid connection 2c of the master brake cylinder 2 is connected to a simulation device 7 in a connection, which can be switched (between active and inactive mode by a valve arrangement described in detail in the following), to the first hydraulic chamber I. When the first valve device 4a is in its actuating position, i.e. the wheel brake 5 is supplied with hydraulic fluid through the electronically controlled pressure source, which is not represented in detail, the simulation device 7 serves to impart to the driver a pedal characteristic which is usual in a conventional brake system when the brake pedal 1 is actuated.

A second valve device 6 is disposed inside the master brake cylinder 2 in the flow path between the first hydraulic chamber I and the simulation device 7, which device 6 blocks the connection between the first hydraulic chamber I of the master brake cylinder 2 and the simulation device 7 (basic position) and opens it (actuating position). It is thereby possible to block the connection from the master brake cylinder 2 to the simulation device 7 during emergency actuation of the wheel brake 5, so that no hydraulic fluid volume can escape into the simulation device 7.

Figure 1A:
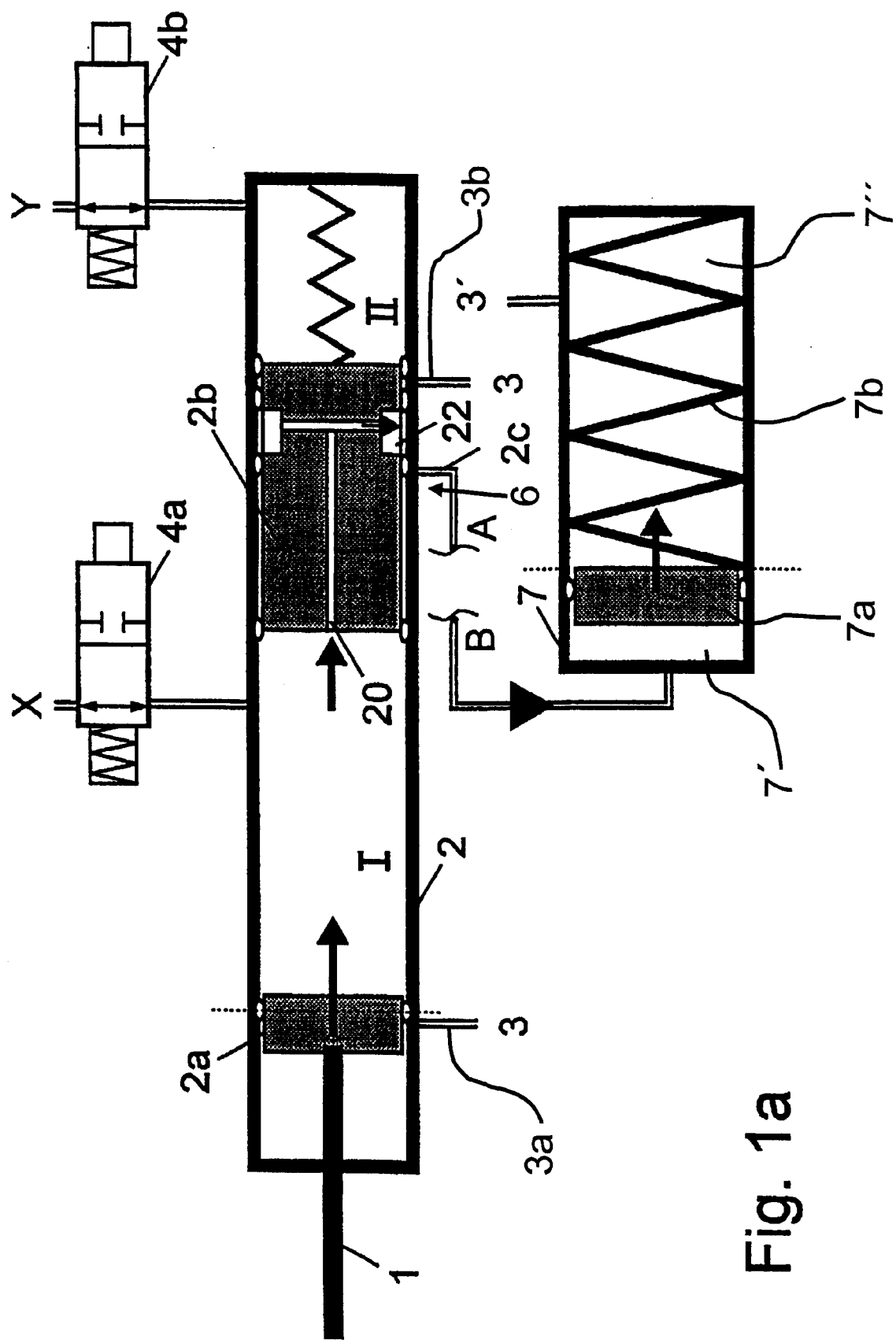

The second valve arrangement or device 6 is formed by the second piston 2b in co-operation with the outlet 2c of the master brake cylinder 2 to the simulation device 7. For this purpose a duct 20 leads in the second piston 2b from the end face, facing the first hydraulic chamber n, of this piston to a lateral outlet 22. The fluid connection 2c to the device 7 for simulating the brake pedal behaviour is disposed at a position of the wall of the master brake cylinder 2 such that, depending on the position of the second piston 2b, it is aligned with the outlet 22 of the duct 20 when the brake circuit X is separated from the master brake cylinder 2 by the first valve arrangement 4a and actuation of the first piston 2a has resulted in a displacement of the piston 2b (see also FIG. 1a).

Figure 1B:
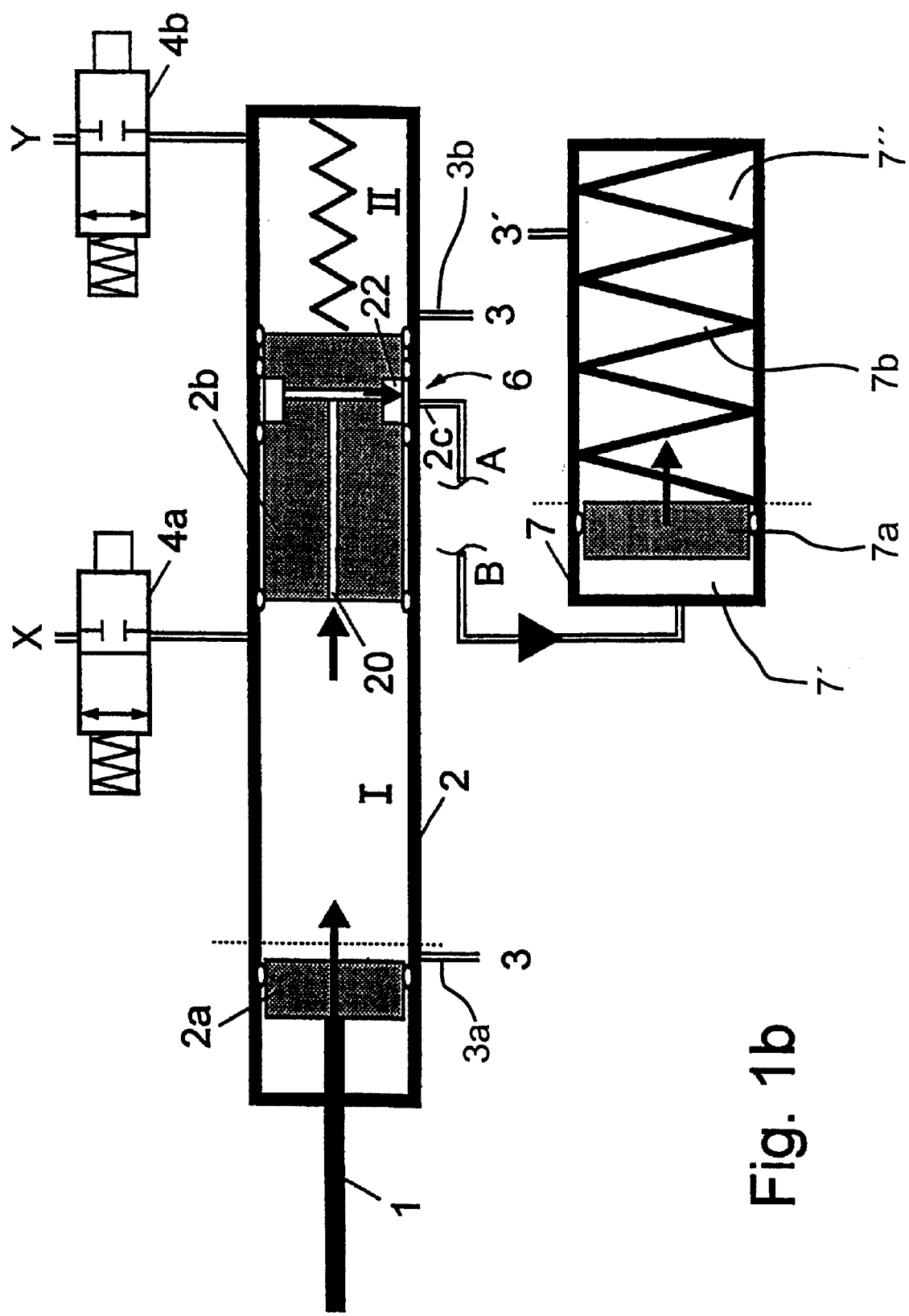

With the first valve arrangements 4a, 4b in their actuating positions, hydraulic fluid can be expelled from the two hydraulic chambers I, II into the respective brake circuits in a corresponding manner when the two pistons 2a, 2b have in each case "overrun" the connections 3a, 3b to the reservoir 3 with their leading edge (so that there is no longer any connection between the hydraulic chambers I, II and the reservoir 3), while the second piston 2b is at the same time displaced by the pressurised hydraulic fluid to an extent such that the outlet 22 is no longer aligned with the connection 2c of the master brake cylinder 2 (see FIG. 1b).

In order to guarantee a connection to the simulation device 7 in the active operating mode, the duct 20 and also the outlet 22 thereof, as well as the connection 2c of the master brake cylinder 2 or the subsequent connection to the simulation device 7 are to be dimensioned accordingly. The piston 2b can be displaced over the entire path available to it in the passive operating mode. As soon as the second piston 2b moves further than the first piston 2a, appropriate dimensioning of the duct 20 and also the outlet 22 thereof, as well as the connection 2c of the master brake cylinder 2 or the subsequent connection to the simulation device 7 ensures that the connection to the simulation device 7 is interrupted, so that hydraulic fluid required for the (emergency) braking action is not forced into the simulation device 7 so that it would not be available for the braking action.

The simulation device 7 has a piston 7a which divides a cylinder into two pressure chambers 7', 7". One pressure chamber 7" is connected to the reservoir 3' for hydraulic fluid. This reservoir 3' may be identical with the reservoir 3 of the master brake cylinder 2 or hydraulically connected to the latter. The other pressure chamber 7' is connected via a characteristic modelling device between the points A and B as well as the second valve arrangement 6 (in its transmitting position) to the master brake cylinder 2 in order to pressurise the piston 7a against the action of a spring element 7b. The spring element 7b preferably has a progressive spring characteristic in order to simulate the pedal characteristic as accurately as possible.

The spring element 7b may be formed in the conventional manner as a helical spring or as a Belleville spring assembly. However it is also possible to form the spring element 7b as an elastomer element, which results in considerable cost advantages since—unlike when using a helical spring—fastening and stop elements can be integrated directly into the elastomer element. The expenditure required when using a helical spring for routing and adjusting the preloading force of the helical spring is also saved. Moreover, the fact that an elastomer element has more pronounced damping properties than a helical spring proves to be of advantage. The advantageous properties of the elastomer element can be achieved by appropriate forming, enclosing and choice of material.

In order to optimise the simulation of the pedal characteristic through hydraulic damping, a first and a second throttle 10, 11 are disposed in the connection between the master brake cylinder 2 and the simulation device 7. The throttles 10, 11 are disposed between the points A, B and connected in parallel with one another, a check valve 12 being connected in series with the second throttle 11. The check valve 12 is oriented such that a flow connection is only possible in the direction from the simulation device 7 to the master brake cylinder 2. Hydraulic fluid consequently flows from the master brake cylinder 2 via the first throttle 10 into the simulation device 7 when the brake pedal 1 is actuated, while hydraulic fluid flows back from the simulation device 7 via both throttles 10, 11 into the master brake cylinder 2 when the actuation of the brake pedal 1 is eased off.

A different damping and therefore pedal characteristic therefore in each case results according to the invention upon actuating the brake pedal 1 and easing off the actuation of the brake pedal 1.

The throttles 10, 11 are dimensioned or adjustable so as to result in a more highly damped pedal characteristic upon actuating the brake pedal 1 than when easing off the actuation of the brake pedal 1. The throttles 10, 11 can be dimensioned in the conventional manner by adjusting the flow cross sections. In order to achieve greater damping upon actuation than when easing off the actuation of the brake pedal 1, either the flow cross sections of the throttles 10, 11 are to be set at an equal size or the flow cross section of the second throttle 11, which is connected in series with the check valve 12, is to be set so as to be greater than the flow cross section of the first throttle 10.

If the spring element 7b of the simulation device 7 already provides sufficient damping, which is particularly the case when using an elastomer element as spring element 7b, it is possible to dispense with the throttle 11 connected in series with the check valve 12.

In the illustrated embodiments the connection between the hydraulic chambers I, II and the reservoir is interrupted according to the "snifter hole" principle, while it will be quite obvious to the person skilled in the art how the latter may be replaced by a "central valve", as the invention is not dependent on this.

In the embodiment according to FIG. 2, when compared with the embodiment according to FIG. 1, a check valve 13 is additionally connected in series with the first throttle 10, the check valve 13 being oriented such that a flow connection is only possible in the direction from the master brake cylinder 2 to the pressure chamber 7' of the simulation device 7. Hydraulic fluid consequently flows from the master brake cylinder 2 via the first throttle 10 into the simulation device 7 when the brake pedal 1 is actuated. Hydraulic fluid flows back from the first pressure chamber 7' of the simulation device 7 via the second throttle 11 into the master brake cylinder 2 when the actuation of the brake pedal 1 is eased off. The flow cross section of the second throttle 11 connected in series with the check valve 12 is in this case greater than the flow cross section of the first throttle 10 connected in series with the check valve 12. Greater damping thereby occurs upon actuating the brake pedal 1 than when easing off the actuation of the brake pedal 1.

In the embodiment according to FIG. 3, when compared with the embodiment according to FIG. 1, a third throttle 15 is connected in parallel with the throttles 10, 11, with a differential pressure valve 14 with a closed basic position being connected in series with this third throttle 15. In this case hydraulic fluid flows from the master brake cylinder 2 via the throttle 10 into the simulation device 7 when the brake pedal 1 is actuated. As soon as the pressure difference between the master brake cylinder 2 and the simulation device 7 exceeds a preset opening pressure difference, the hydraulic fluid flows from the master brake cylinder 2 via the second and third throttle 10, 15 into the simulation device 7. If the actuation of the brake pedal 1 is eased off, hydraulic fluid will flow back from the simulation device 7 via the first and second throttle 10, 11 into the master brake cylinder 2.

As the pressure difference between the master brake cylinder 2 and the simulation device 7 is related to the actuating force exerted on the brake pedal 1, the damping characteristic is in this case adjusted in accordance with the actuating force. When the differential pressure valve 14 is in its closed basic position, the pressure difference between the master brake cylinder 2 and the simulation device 7 is dependent on the volumetric flow through the first throttle 10. The volumetric flow is also related to the actuating speed of the brake pedal 1. The adjustment of the damping characteristic is therefore also dependent on the actuating speed. Generally speaking, the damping characteristic can therefore be adjusted when actuating the brake pedal 1 by adjusting the opening pressure difference of the differential pressure valve and by dimensioning the flow cross section of the first throttle 10 in accordance with the actuating force and the actuating speed of the brake pedal 1 for exact simulation of the pedal characteristic.

FIGS. 4 and 5 show in diagrammatic form a further embodiment in which the simulation device 7 is integrated into the flow path of the duct 20 (either in the longitudinal path—FIG. 4 or in the transverse path—FIG. 5).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Actuator unit for an electronically controlled hydraulic vehicle brake system, with
   a master brake cylinder in which a first piston, which can be displaced by an actuator, is disposed,
   a first brake circuit which can be connected by a first valve arrangement in a basic position to the master brake cylinder or separated from the latter thereby in an actuating position, and
   a device which can be connected to a hydraulic chamber of the master brake cylinder to simulate a brake pedal behavior, wherein
   a second piston is disposed in a displaceable manner in the master brake cylinder and
   the displacement of one piston causes the displacement of the other piston, wherein the device for simulating the brake pedal behavior is switched to an active or inactive mode through the displacement.

2. Actuator unit for an electronically controlled hydraulic vehicle brake system according to claim 1, characterized in that
   the two pistons define with one another and with a wall of the master brake cylinder a first and second hydraulic chamber, wherein hydraulic fluid is held in these hydraulic chambers.

3. Actuator unit for an electronically controlled hydraulic vehicle brake system according to claim 2, characterized in that
   the second piston also comprises a duct leading from one of the hydraulic chambers to a lateral outlet, wherein a fluid connection to the device for simulating the brake pedal behavior is disposed such that, depending on the position of the second piston, it is aligned with the lateral outlet of the duct when the first brake circuit is separated from the master brake cylinder by the first valve arrangement.

4. Actuator unit for an electronically controlled hydraulic vehicle brake system according to claim 1, characterized in that
   the device for simulating the brake pedal behaviour comprises a spring arrangement which is set up to act against the hydraulic pressure from the master brake cylinder, and a characteristic modelling device is also associated with this device.

5. Actuator unit for an electronically controlled hydraulic vehicle brake system according to claim 4, characterized in that
   the characteristic modelling device is disposed between the master brake cylinder and the device for simulating the brake pedal behaviour.

6. Actuator unit for an electronically controlled hydraulic vehicle brake system according to claim 4, characterized in that
   the characteristic modelling device is disposed in one of the pistons in the master brake cylinder, preferably in a flow path between one of the hydraulic chambers and the lateral outlet of the second piston.

7. Actuator unit for an electronically controlled hydraulic vehicle brake system according to claim 4, characterized in that
   the characteristic modelling device is disposed between the device for simulating the brake pedal behaviour and a hydraulic reservoir.

8. Actuator unit for an electronically controlled hydraulic vehicle brake system according to claim 1, characterized in that the device for simulating the brake pedal behaviour is formed by a cylinder/piston arrangement, in which a piston is loaded by a spring arrangement.

9. Actuator unit for an electronically controlled hydraulic vehicle brake system according to claim 6, wherein the characteristic modelling device is disposed in the flow path between one of the hydraulic chambers and the lateral outlet of the second piston.

* * * * *